Figure 1:
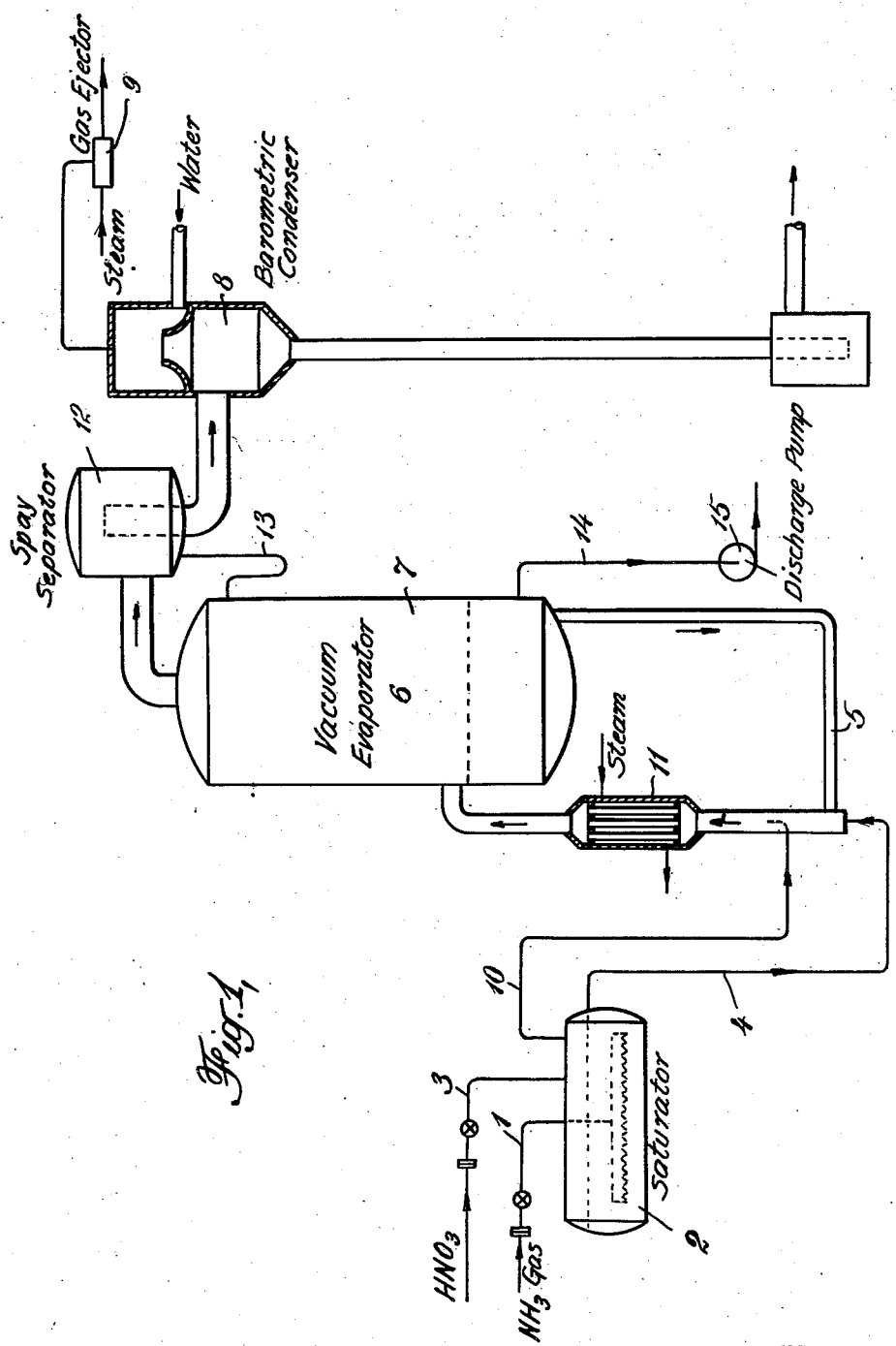

July 25, 1939.  D. A. ROGERS ET AL  2,167,464

MANUFACTURE OF AMMONIUM NITRATE

Filed May 18, 1937   3 Sheets-Sheet 2

INVENTORS
Donald A. Rogers
Charles W. Brown
BY
ATTORNEY

July 25, 1939.　　　D. A. ROGERS ET AL　　　2,167,464
MANUFACTURE OF AMMONIUM NITRATE
Filed May 18, 1937　　　3 Sheets-Sheet 3

INVENTORS
Donald A. Rogers
Charles W. Brown
BY
ATTORNEY

Patented July 25, 1939

2,167,464

UNITED STATES PATENT OFFICE 2,167,464

MANUFACTURE OF AMMONIUM NITRATE

Donald A. Rogers, Petersburg, Va., and Charles W. Brown, Yonkers, N. Y., assignors to The Solvay Process Company, New York, N. Y., a corporation of New York Application May 18, 1937, Serial No. 143,260

6 Claims. (Cl. 23—103)

In the manufacture of ammonium nitrate from aqueous nitric acid and ammonia difficulties have been encountered in prior processes in utilizing the heat of reaction for the evaporation of water from the ammonium nitrate solution formed. This water is introduced with the reactants supplied to the process. It has been proposed to introduce the ammonia and nitric acid into a reaction vessel in which the heat liberated by the reaction causes the ammonium nitrate solution formed to boil and to become concentrated. In such a process, wherein the reaction of the ammonia and nitric acid takes place simultaneously with the vaporization of water, there are relatively large losses of fixed nitrogen in the vapors and fumes from the boiling solution and it has heretofore been uneconomical to recover the fixed nitrogen thus lost from the reaction vessel. It has, therefore, been proposed to provide special facilities to keep the ammonium nitrate solution in the reaction chamber from boiling, as for example by cooling the solution or by maintaining it under a pressure such that it does not boil at the temperature to which it is heated. This requires a complicated apparatus and close control of the process, and when the solution in the reaction chamber is cooled by an extraneous cooling medium, the heat evolved by the reaction is wasted and a relatively dilute ammonium nitrate solution is produced.

It is an object of the present invention to provide a process and apparatus for the production of a concentrated solution of ammonium nitrate whereby the heat of the reaction may be utilized for evaporation of water introduced with the reactants in a novel assembly of standard, uncomplicated apparatus units and in which the control of the process is highly simplified.

The invention involves reacting ammonia and an aqueous solution of nitric acid to form a solution of ammonium nitrate, the reaction being carried out under conditions of temperature and pressure such that the resulting aqueous solution of ammonium nitrate boils. The ammonia employed may be gaseous or liquid anhydrous ammonia or aqua ammonia. However, gaseous ammonia is specially suited to use in the present process, as in this case the maximum amount of heat is available for evaporation of water, and no unnecessary dilution is caused by the addition of water with the ammonia. The hot vapors and fumes evolved from the boiling ammonium nitrate solution are condensed and absorbed by passing them in direct contact with an aqueous liquor. By this procedure the heat of vaporization of the vapors and fumes is converted into sensible heat in the aqueous liquor. Following this condensation the liquor is evaporated by reducing the water vapor pressure on the liquor, as by a vacuum or an inert gas. By this procedure the sensible heat of the solution is reconverted into heat of vaporization. The hot solution of ammonium nitrate produced by the reaction of the ammonia and nitric acid is cooled, preferably by subjecting it to a reduced pressure to evaporate water from the solution and to cool it. Preferably, this cooled solution is employed as the aqueous liquor used to contact and condense the steam and thereby absorb the vapors and fumes. By operating according to this invention, the heat contained in the boiling solution of ammonium nitrate formed by reaction of the ammonia and nitric acid and that contained in the evolved vapors and fumes may be utilized to evaporate water introduced into the system from the ammonium nitrate without loss of fixed nitrogen along with the evaporated water.

Figure 2:
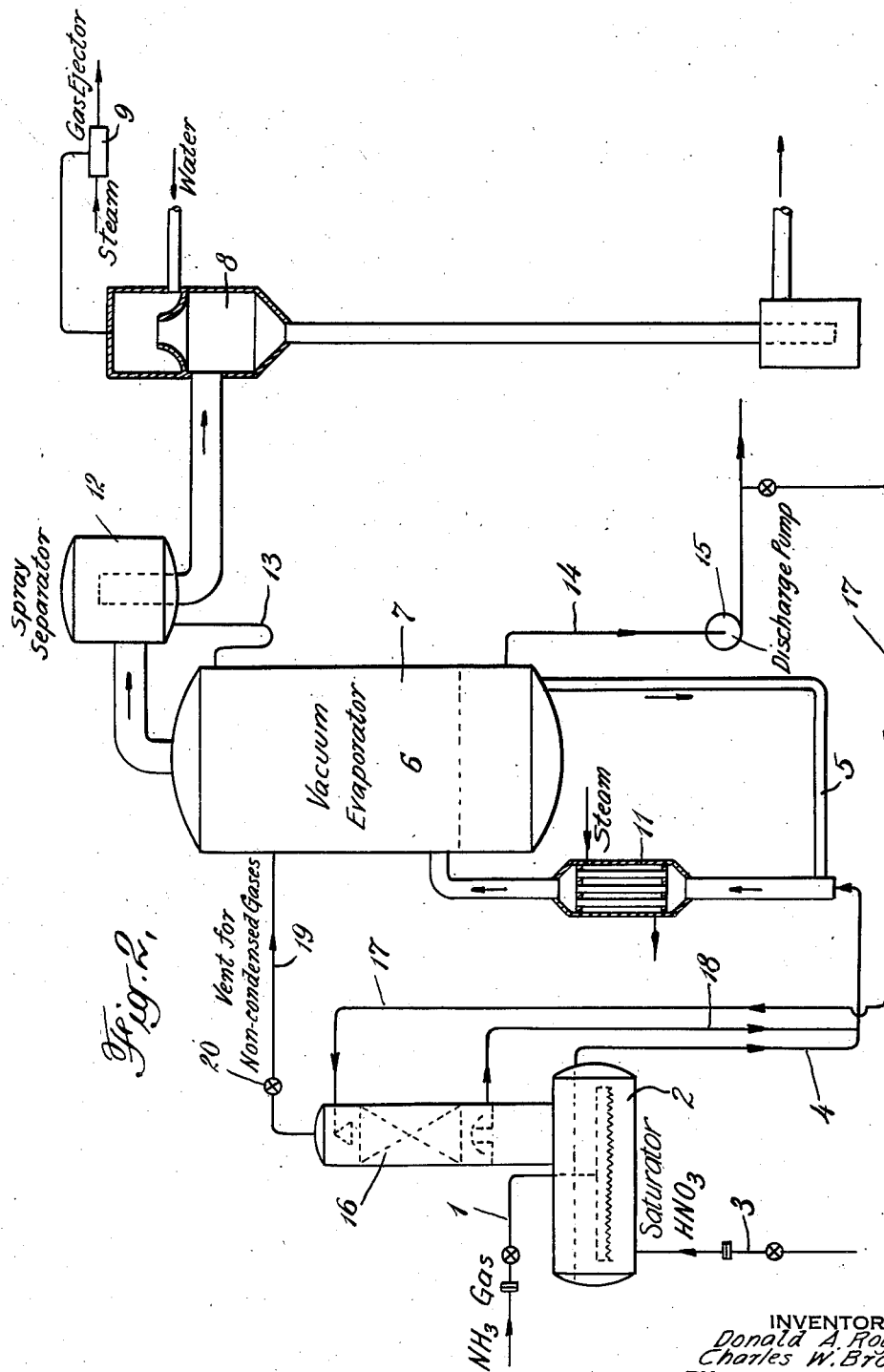
Figure 3:
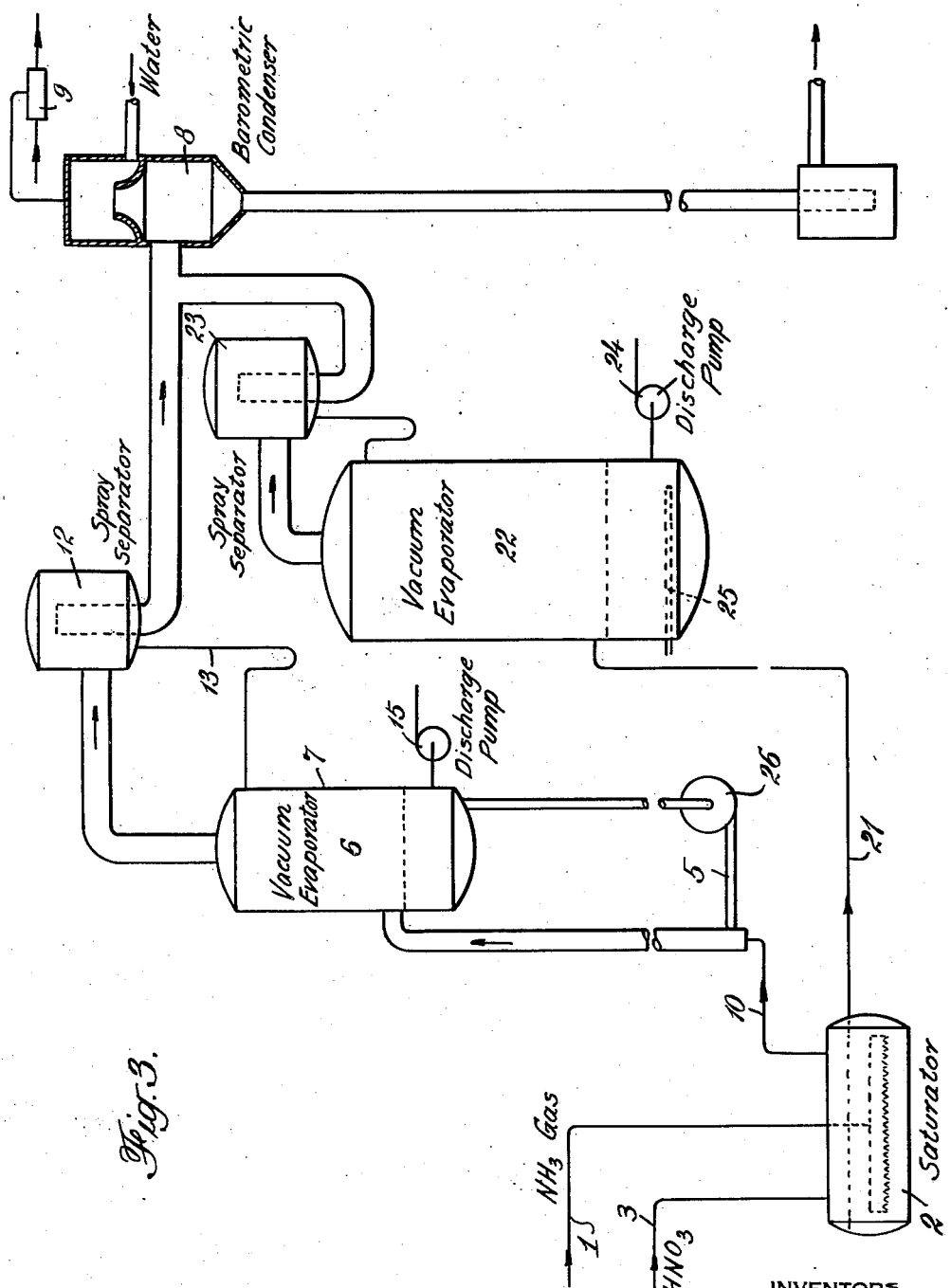

The invention will be further described in connection with the following examples and the accompanying drawings:

In the drawings there are illustrated three systems suitable for the manufacture of ammonium nitrate in accordance with the present invention. Fig. 1 shows a preferred form of apparatus, and Figs. 2 and 3 show two modifications thereof.

The apparatus of Fig. 1 comprises a reaction vessel or saturator 2 and a vacuum evaporator 6 of standard type, comprising a flash chamber or vaporizing chamber 7, heater 11, and a U-tube 5 for circulating liquid from flash chamber 7 through heater 11 and back to the chamber. A barometric condenser 8 and gas ejector 9 are provided for maintaining a pressure below atmospheric in flash chamber 7. The apparatus of Fig. 2 includes the above features of the apparatus of Fig. 1 and, in addition, includes a gas scrubbing tower 16. The apparatus of Fig. 3 likewise includes the above features of the apparatus of Fig. 1 and, in addition thereto, a second evaporator 22 for the concentration of reaction liquor. The function of the various gas and liquid conduits connecting the several pieces of apparatus will appear from the following description of the process of the invention as carried out in the apparatus.

In carrying out the process of this invention employing the apparatus of Fig. 1, ammonia gas (preferably substantially pure) is continuously introduced by a pipe 1 into a saturator 2 beneath the surface of a body of ammonium nitrate solution contained therein. Nitric acid, for example, 40% nitric acid, is continuously introduced into the saturator by a pipe 3. The heat of reaction of the introduced materials causes the solution in the saturator to boil and become partially concentrated by vaporization of water introduced with the nitric acid. It is preferred to maintain the pressure in the saturator at about atmospheric pressure, under which pressure the boiling solution will be at a temperature of about 112° C. The pressure in saturator 2 may, however, be above or below atmospheric. The temperature of the boiling solution will be changed from the 112° C. given above when the pressure in the saturator is above or below atmospheric or when a nitric acid is used of a concentration other than the 40% acid of this example.

The solution from the saturator is conveyed by a pipe 4 and introduced into the up-flow leg of circulating tube 5 of vacuum evaporator 6 to help promote circulation of the liquid through 5 by mixing the hot solution with the cooler solution circulating in tube 5. A substantial vacuum, for example 0.1 atmosphere, is maintained in flash chamber 7 of evaporator 6 by means of condenser 8 and gas ejector 9. The legs of tube 5 are of sufficient vertical height that the solution in the lower portion thereof is under substantially atmospheric pressure. The mixture of vapors and fumes escaping from the solution in the saturator is led off from the saturator through a pipe 10 and is introduced into the bottom portion of the upflow leg of tube 5 in which the vapors and fume are intimately contacted with the solution circulating through the tube. The solution rising in the up-flow leg is heated in passing through heater 11 and is then introduced into flash chamber 7. Steam evolved from the solution in the flash chamber is evacuated through a spray separator 12 and the liquid collected in the separator is returned to the flash chamber through line 13. Concentrated ammonium nitrate solution is drawn from the evaporator through a pipe 14 by means of a pump 15.

The solution in the flash chamber is cooled to about 63° C. by evaporation of water. Circulating tube 5 is so designed that the rate of circulation of the cooled solution through the tube is such that it condenses the steam in the vapors and fumes introduced into the solution from the saturator. With the condensation of the steam, the nitrogen-containing vapors and fumes are absorbed in the solution. Any non-condensable gas carried by the vapors will be washed substantially free of vapors and fumes which contain a high percentage of fixed nitrogen. The heat liberated in condensing the steam is absorbed by the circulating solution and is available for evaporating water from the solution in flash chamber 7. Under the conditions set forth in this example, with the solution from chamber 7 flowing into the bottom of the upflow leg of circulating tube 5 at a temperature of 63° C., the solution entering heater 11 will be at a temperature of about 68° C. Of the heat imparted to the circulating solution thus to raise its temperature 5° C., about ⅕ is from the hot liquid introduced from saturator 2 and about ⅘ is from the vapors from the saturator. Additional heat for evaporation of water from the solution is supplied in heater 11.

Numerous changes may be made in the process and apparatus described above and illustrated in Fig. 1. In the apparatus as described the flow of solution through the circulating tube of the vacuum evaporator is induced primarily by the difference in specific gravity of the solution in the up-flow leg as compared with that in the down-flow leg. A pump may be connected in the circulation tube to increase the rate of circulation, and the capacity of the evaporator may be thereby increased. With a pump to circulate the solution through the evaporator tube, heater 11 may be removed from the up-flow leg and the solution in the flash chamber may be heated, for example, by a bayonet type heater in the flash chamber itself.

In carrying out the process in the apparatus shown in Fig. 2, ammonia gas and nitric acid are introduced into saturator 2, ammonium nitrate solution is withdrawn from the saturator and introduced into circulating tube 5 of evaporator 6, which is connected with spray separator 12, barometric condenser 8 and ejector 9, and the solution is concentrated in the evaporator, all as described above in connection with the process carried out in the apparatus by Fig. 1. However, instead of withdrawing the vapors and fumes from the saturator and introducing them into the circulating tube of the evaporator, the vapors and fumes pass into a separate packed tower 16. Cooled solution from the flash chamber of the evaporator is introduced into the upper end of the tower by pipe 17 communicating with the discharge of pump 15. This cool solution is intimately contacted in tower 16 with the vapors and fumes from the saturator to cool them and condense the steam and absorb the fumes and nitrogen-containing vapors. The liquid flowing to the bottom of tower 16 is withdrawn through a pipe 18 and introduced into pipe 4 through which it is conveyed to the circulating tube of the evaporator with the solution from the saturator. Non-condensable gases are withdrawn from the upper portion of the tower by a pipe 19 provided with a reducing valve 20 and introduced into the upper portion of the concentrator above the level of the solution therein.

In carrying out the process in the apparatus shown in Fig. 3, ammonia gas and nitric acid are introduced into saturator 2, the vapors and fumes from the saturator are introduced into circulating tube 5 of evaporator 6, which is connected with spray separator 12, barometric condenser 8 and ejector 9. The ammonium nitrate solution withdrawn from the saturator, instead of being passed to evaporator 6, as in the processes carried out in the apparatus of Figs. 1 and 2, is conducted by pipe 21 to a separate flash chamber or vacuum evaporator 22 for concentration. Evaporator 22 may be provided with a a suitable heater such as bayonet heater 25. The vacuum may be maintained therein by passing the vapors therefrom to barometric condenser 8 through a spray separator 23. In starting operations, vacuum evaporator 6 is supplied with an aqueous liquor which may be, for instance, water or a previously formed solution of ammonium nitrate. As operation progresses, the liquor becomes a concentrated solution of ammonium nitrate and is, in fact, the evaporated condensate of the vapors and fumes though operations may have been started with water in the evaporator. A pump 26 is provided to effect circulation of the liquor through the tube 5. The solution may be withdrawn from the vacuum evaporator 6 by discharge pump 15 for any suitable disposition, such as return to the saturator, introduction into pipe 21 or delivery to storage along with the solution from evaporator 22 withdrawn therefrom by discharge pump 24.

In carrying out the process of this invention the vapors and fumes evolved from the boiling ammonium nitrate solution in the reaction vessel are condensed by passing them in direct contact with a quantity of the aqueous liquor sufficient to condense the steam by cooling the vapors and fumes to a temperature below the boiling point of the aqueous liquor at the pressure under which it is contacted with the vapors and fumes.

In the preferred process described above, the pressures in the reaction vessel and on the solution in contact with the vapors and fume from the reaction vessel are both about atmospheric. It is not necessary, however, that these two pressures be the same. For example, the pressure in the reaction vessel may be higher or lower than the pressure on the solution in contact with the vapors and fumes. Providing means to maintain different pressures in these two parts of the system complicates the apparatus used for carrying out the process. It is preferred, therefore, that these pressures be about equal, the pressure on the solution used for scrubbing the gases and vapors being only sufficiently lower than the pressure in the reaction vessel that the gases and vapors will flow from the reaction vessel into contact with the solution.

The evaporation of the ammonium nitrate solution from the reaction vessel is carried out with the solution in contact with an atmosphere having a lower water vapor pressure than the water vapor pressure in the atmosphere in contact with the boiling solution of ammonium nitrate in the reaction vessel. Under these conditions the solution from the reaction vessel is cooled by evaporation of water at the lower pressure and may then serve to condense steam from the vapors and fumes evolved from the solution in the reaction vessel. In the apparatus of the drawings, since the water vapor pressure in the flash chamber of the evaporator is substantially the total pressure in the chamber, the barometric condenser and gas ejector are employed to maintain the desired low water vapor pressure. Instead of using a vacuum evaporator, the ammonium nitrate solution may be evaporated by being contacted with an inert gas, such as air, which by sweeping the water vapor out of the evaporator chamber maintains a reduced water vapor pressure in the chamber. An inert gas may be used similarly in carrying out the process illustrated in Fig. 3 of the drawings, to evaporate water from and to cool the condensate employed for cooling the vapors and fumes from the saturator.

We have pointed out above in describing the process illustrated in Fig. 1, that by introducing relatively pure ammonia gas and 40% aqueous nitric acid in the saturator, about four-fifths of the heat, evolved by the reaction and utilized for evaporation of water from the ammonium nitrate solution, is contained in the vapors and fumes and only about one-fifth is contained in the solution. The objects of this invention may be attained in many cases, therefore, without utilizing the heat contained in the solution to evaporate the solution. Accordingly, instead of cooling the solution by evaporation as in the preferred process, the solution may be cooled by heat exchange with a cooling medium, for example, and the thus cooled solution contacted with the vapors and fumes from the reaction chamber, or in the process illustrated in Fig. 3 the solution drawn from the saturator need not be evaporated in a vacuum evaporator to utilize the heat contained in the solution itself. In such processes most of the heat of the reaction available for concentrating the ammonium nitrate solution may be utilized and the losses of fixed nitrogen in the vapors and fumes from the reaction vessel minimized.

We claim:

1. The process for the production of ammonium nitrate, which comprises continuously reacting gaseous ammonia and aqueous nitric acid under a pressure such that the solution of ammonium nitrate produced is boiled by the heat of the reaction and water vapor accompanied by substantial proportions of nitrogen compounds escapes from the solution and a concentrated aqueous solution of ammonium nitrate is produced, continuously withdrawing hot aqueous ammonium nitrate solution from the zone of reaction, introducing the withdrawn solution into a cyclic system in which the solution is circulated through an evaporating chamber and a means for contacting a liquid and a gas, in said evaporating chamber subjecting the solution circulating therethrough to a pressure at which water is evaporated from the solution to concentrate and cool it, circulating thus cooled solution from the evaporating chamber to said means for contacting a liquid and a gas, introducing into said means the vapors and fumes evolved from said boiling ammonium nitrate solution and contacting them therein with said cooled solution at a pressure greater than that in said evaporator, thereby condensing said vapors and fumes in the solution and heating the solution, and continuously withdrawing from said cyclic system concentrated ammonium nitrate solution.

2. The process for the production of ammonium nitrate which comprises continuously reacting ammonia and aqueous nitric acid under conditions of temperature and pressure at which the resulting aqueous solution of ammonium nitrate boils and water vapor accompanied by substantial proportions of nitrogen compounds escapes from the solution and a concentrated aqueous solution of ammonium nitrate is produced, cooling the evolved vapors and fumes to a temperature at which an aqueous condensate is condensed therefrom, continuously circulating said condensate in a cycle in which the condensate is subjected to a pressure below its water vapor pressure to evaporate water therefrom and to cool the condensate and thereafter the pressure on condensate thus cooled is increased and condensate on which the pressure has been thus increased is introduced into a means for contacting a liquid and gas and therein is directly contacted with vapors and fumes evolved from said boiling ammonium nitrate solution to accomplish the aforesaid cooling of the vapors and fumes, and continuously withdrawing from the cycle condensate from which water has been evaporated by the heat absorbed from said vapors and fumes.

3. In combination in an apparatus for the production of a concentrated solution of ammonium nitrate, a reaction vessel and means for separately introducing thereinto ammonia and aqueous nitric acid, an evaporator having a vaporizing chamber adapted to be operated with a lower pressure in the vaporizing chamber than the pressure in said reaction vessel, means for passing liquid from said reaction vessel to said evaporator, means for withdrawing vapors and fumes from said reaction chamber and means for withdrawing liquid from the vaporizing chamber of said evaporator, for contacting the withdrawn liquid with vapors and fumes withdrawn from said reaction vessel at a pressure higher than the pressure in said vaporizing chamber, and for returning the liquid to said vaporizing chamber.

4. The process for the production of ammonium nitrate which comprises reacting ammonia and aqueous nitric acid under a pressure at which the ammonium nitrate solution produced by the reaction is boiled by the heat liberated by the reaction and vapors and fumes of nitrogen compounds are evolved, subjecting the ammonium nitrate solution thus produced in an evaporating chamber to a water vapor pressure lower than that under which the ammonia and nitric acid are reacted, thereby evaporating water and cooling the solution, withdrawing thus cooled solution from the evaporating chamber and introducing it into a means wherein it is directly contacted with the aforesaid vapors and fumes at a temperature below the boiling point of said cooled solution under the pressure at which it is contacted with said vapors and fumes and in amount sufficient to condense the steam contained in the vapors and fumes and absorb said vapors and fumes.

5. The process for the production of ammonium nitrate which comprises continuously reacting gaseous ammonia and aqueous nitric acid under conditions of temperature and pressure at which the resulting aqueous solution of ammonium nitrate boils, water vapor accompanied by substantial proportions of fumes of nitrogen compounds escapes from the solution and a concentrated aqueous solution of ammonium nitrate is produced, continuously circulating an aqueous solution of ammonium nitrate in a cyclic system comprising a vacuum evaporator chamber and liquid circulating legs depending therefrom, in which system the solution therein is evaporated under a pressure below atmospheric in said evaporator chamber and the resulting cooled solution is continuously circulated from the evaporator chamber through said legs to a point in the legs whereat the solution is directly contacted with the vapors and fumes evolved from the boiling ammonium nitrate solution at an increased pressure sufficiently above that in the evaporator chamber to condense said vapors and fumes while heating the solution to below its boiling point under said increased pressure, circulating the solution in which said vapors and fumes have been condensed back to said evaporator chamber and therein vaporizing water from the solution under the lower pressure in the evaporator chamber by means of heat absorbed in the solution by condensing therein said vapors and fumes, continuously withdrawing concentrated ammonium nitrate solution from said circulatory system and continuously introducing thereinto the ammonium nitrate solution formed by reaction of the aforesaid ammonia and nitric acid to provide the ammonium nitrate solution circulated in said system as hereinbefore described.

6. The process for the production of ammonium nitrate which comprises continuously reacting ammonia and aqueous nitric acid under conditions of temperature and pressure at which the resulting aqueous solution of ammonium nitrate boils and water vapor accompanied by substantial proportions of nitrogen compounds escapes from the solution and a concentrated aqueous solution of ammonium nitrate is produced, continuously circulating an aqueous ammonium nitrate solution in a cycle in which the solution is subjected to a pressure below its water vapor pressure to evaporate water therefrom and to cool the solution and thereafter the pressure on the solution thus cooled is increased and the solution on which the pressure has been thus increased is introduced into a means for contacting a liquid and gas and therein is directly contacted with vapors and fumes evolved from said boiling ammonium nitrate solution to condense the aforesaid vapors and fumes in said circulating solution, and continuously withdrawing from the cycle ammonium nitrate solution from which water has been evaporated by the heat absorbed from said vapors and fumes.

DONALD A. ROGERS.
CHARLES W. BROWN.